3,067,105
VITAMIN COMPOSITIONS AND PROCESSES FOR PRODUCING SAME
Herman D. Ratish, Flushing, N.Y., and Melvin Hochberg, Livingston, N.J., assignors to Nopco Chemical Company, Harrison, N.J., a corporation of New Jersey
No Drawing. Filed Sept. 22, 1959, Ser. No. 841,463
6 Claims. (Cl. 167—81)

This invention relates, in general, to new and improved vitamin-containing products. More particularly, the invention relates to vitamin-containing compositions, in the form of discrete free-flowing particles, which are characterized both by their stability and by their enhanced biological availability and/or effectiveness.

Vitamin-containing products, in the form of discrete particles, are well known in the art. Moreover, the suitability of such products for use in the production of foods, in the preparation of pharmaceutical tablets and powders for human consumption, in the formulation of poultry and animal foods and feeds, etc. is widely acknowledged. In recent years, extensive research has been carried out in connection both with vitamin-containing products, including their production, and with the uses thereof. In general, the art has been seeking to furnish a product, which can be produced readily in large scale quantities and which is capable of providing vitamins in a form in which they are stable, but yet completely biologically available and/or ecective. For the most part, this objective has been sought to be achieved by coating the vitamin or vitamins with, or somehow incorporating the vitamin or vitamins into, some suitable protective media. Gelatin is perhaps one of the best known of the various media heretofore utilized in the preparation of such products. However, even the use of gelatin is not devoid of disadvantages. One of the most serious objections to the use of gelatin is the fact that great care must be exercised in the drying of gelatin-type products. To minimize the possibility of the destruction of the vitamins therein, the product must be dried under strictly controlled humidity conditions. The necessity of having to use rigid drying controls increases both equipment and production costs. Moreover, equipment failure or human error during the drying operation could easily result in complete or partial loss of a batch. Furthermore, under conditions of high humidity, gelatin-type products are often far less stable than is desirable. On the other hand, certain prior art products, which employ a protective media other than gelatin, have been found to be far less biologically available than is desirable. Improvements in all of the foregoing respects, and, particularly, in the biological availability and/or effectiveness of such products, are still considered to be possible and are constantly being sought.

It is the object of this invention to provide dry, vitamin-containing compositions in the form of free-flowing, discrete particles.

It is a further object of the invention to provide dry, vitamin-containing compositions which, in the form of discrete particles, are both stable and biologically available and/or effective.

Other objects of the invention will be obvious and they will, in part, appear hereinafter.

It has been discovered, that, when an intimate mixture comprising (1) a fat-soluble vitamin material and (2) a carrier, the nature of which will be described hereinafter, and in certain embodiments of the invention, (3) an effective antioxidant, is added to, and mixed with, in an organic solvent solution of a protein material, products can be obtained from the suspension, thus obtained, in the form of discrete, free-flowing particles. These particles are stable and they are especially characterized by their greatly enhanced biological availability and/or effectiveness.

As a preliminary step to carrying out the present invention, a protein material, namely, zein, is dissolved in a suitable organic solvent. Normally, this will be accomplished at or around ordinary room temperatures simply by adding the zein to, and mixing it with, an appropriate unheated solvent. If desired, the preparation of the zein solution can be facilitated somewhat by heating the solvent either prior to or after the addition of zein. Generally, however, when an elevated temperature is used in producing the solvent solution of zein, temperatures not exceeding about 60° C will be employed.

A further step, also preliminary to the actual practice of the invention, involves the preparation, in a separate vessel, of a mixture comprising (1) the fat-soluble vitamin material and (2) the carrier and, in certain embodiments of the invention (3) an effective antioxidant. The methods by which this mixture is prepared will be discussed fully hereinafter. After these preliminary operations have been completed, the mixture comprising (1) the vitamin material and (2) the carrier and, in those instances in which it is used, (3) the antioxidant is added to, and suspended in, the aforementioned organic solvent solution of zein. The stable and available vitamin-containing compositions of our invention are obtained subsequently by converting the liquid product, referred to herein for convenience as a suspension, into dry, solid particles. Neither the manner in which the aforementioned suspension is produced, nor the method by which the solid particles are obtained therefrom, constitutes a critical limitation on the practice of this invention. In general, completely satisfactory results will be obtained merely by adding the mixture to the solvent solution of the protein, or vice versa, accompanied by efficient mixing. This operation will be facilitated by the use of some mechanical means of agitation and, hence, some stirring or mixing device will be utilized in the preferred practice of the invention. A suitable suspension can be prepared by vigorous manual stirring. However, for obvious reasons, manual stirring is neither practical or efficient. Furthermore, there are various methods by which our products can be obtained from the suspension in the desired dry, particulate form. These methods will be described fully hereinafter.

Zein which is employed in the formation of our novel compositions is a commercially available protein extracted from corn gluten. It is, a naturally occurring high polymer, having a probable molecular weight within the range of 20,000 to 30,000, composed of a number of amino acid residues bound by peptide linkages. As indicated heretofore, zein is dissolved in some suitable organic solvent in an operation which is preliminary to the practice of our invention. In the production of our products one may use any organic solvent, either anhydrous or aqueous, provided, however, that zein is soluble therein. Preferably, however, low molecular weight, aliphatic, monohydric alcohols, such as, methyl alcohol, ethyl alcohol and isopropyl alcohol, are used. Among the anhydrous alcohols, only methyl alcohol is a true solvent for zein. Anhydrous methyl alcohol is used in the preferred practice of the invention. Suitable also, however, are commercial aqueous ethyl alcohol (95%) and commercial aqueous isopropyl alcohol (91%). Moreover since zein is soluble in aqueous ethyl and isopropyl alcohols containing as much at 40% of water by volume, such aqueous alcohols can also be used in the practice of the invention.

The concentration of the solvent solution of zein which is used in the practice of the invention is not, in and of itself, critical. The concentration of that solution, however, is a factor which has particular significance in determining the technique or method which will be best suited for use in the production of our products in particulate form. The manner in which the concentration of the zein solution bears upon the technique or method to be used in producing our products will, however, be discussed more fully hereinafter. It may be noted at this point, however, that we prefer to employ a solution containing a ratio of from about 2 to about 6 parts by weight of solvent for each part by weight of zein.

In carrying out our invention, any of the natural or synthetically produced fat-soluble vitamins, that is, vitamins A, D, E or K, can be used. To a great extent, however, the invention will be concerned with compositions containing either vitamin A or vitamin D or mixtures thereof. Thus for example, activated sterols, such as, ergosterol or irradiated 7-dehydrocholesterol, vitamin A in alcohol form, vitamin A produced by synthetic methods, fish oils, fish liver oils, vitamin concentrates prepared from such oils, etc. can be used in producing our novel products. Vitamin A in ester form can be used also but we have found, for example, that far more satisfactory products are obtained where vitamin A palmitate rather than vitamin A acetate is used. Moreover, precursors of vitamin A, such as, carotene, can be used in the production of our products in place of vitamin A, if desired. Those vitamin compositions of our invention which contain vitamin A, will have a potency of at least about 1,000 U.S.P. units of vitamin A per gram. Generally, the vitamin A products of the invention will contain at least about 30,000 U.S.P. units of vitamin A per gram and, preferably, between about 100,000 to 500,000 U.S.P. units of vitamin A per gram. Those vitamin compositions of our invention which contain only vitamin D, will have a potency of at least about 10,000 U.S.P. units of vitamin D per gram and, preferably, about 100,000 U.S.P. units of vitamin D per gram or higher.

In general, any one of many products may be used in the practice of this invention as the so-called "carrier." As used herein the term carrier is employed to denote hydrophilic compounds which are organic in nature and which, when employed as disclosed herein, contribute greatly both to the stability and the biological availability and/or effectiveness of the product. Suitable for use as the carrier are synthetic polysaccharides; natural gums, such as, guar gum; normally solid polyethylene glycols; normally solid fatty acids, such as, palmitic acid, stearic acid, etc.; sorbitol powder; glyceryl monostearate; pectins; starch; starch dextrins; non-fat dry milk; and mixtures of two or more of these. Well suited for use are synthetic polysaccharides sold by Corn Products Co., New York, New York under the trade-name Polyose. These are powdery products, produced by the controlled and catalyzed polymerization of special corn sugars, which are soluble in water and insoluble in organic solvents. They are available commercially under the trade-names Polyose A, Polyose B, Polyose C and Polyose D. Normally solid polyethylene glycols which have been found to be especially well suited for use are sold under the trademark Carbowax by Carbide and Carbon Chemicals Company, New York, New York. Carbowax 4000 (average molecular weight of 3000 to 3700 and a freezing range of 53° C. to 56° C.) and Carbowax 6000 (average molecular weight of 6000 to 7500 and a freezing range of 60° C. to 63° C.) are used in certain preferred embodiments of the invention. In addition, mixtures of synthetic polysaccharides, such as, the various Polyose products, with the various Carbowax products are suitable for use. The other carriers mentioned heretofore, or mixtures of two or more of such carriers, can be used alone. Moreover, such other carriers can be used in admixture with Polyose products or Carbowax products or in admixture with a combination thereof.

An edible and effective antioxidant can be, and is preferably used in the practice of this invention. As used throughout the present specification and in the claims, the term "edible" is used to denote a material which may be eaten by humans and animals, in the amount in which they are present in the products of the invention, without any deleterious effect resulting therefrom. By "effective antioxidant" we mean an antioxidant capable of exerting an antioxidizing influence on the vitamins in connection with which it is used. While an effective antioxidant will be used in the preferred embodiment of the invention, for example, where vitamin A, or a mixture containing vitamin A, is in use, where a less sensitive vitamin, such as, vitamin D, is the sole vitamin ingredient of the product, the use of the antioxidant may be dispensed with. Suitable for use in the practice of the invention are edible antioxidants, such as, propyl gallate, butylated hydroxy anisole, butylated hydroxy toluene, gallic acid, nordihydroguariaretic acid, ascorbyl palmitate, etc. and mixtures of these. In addition to these compounds, however, one may use other edible antioxidants, as, for example, vitamin E, mixed tocopherols and natural antioxidants of the types disclosed and claimed in U.S. Patents Nos. 2,345,576, 2,345,578, 2,433,593 and 2,434,790. Natural antioxidants of the type which are produced by the processes disclosed and claimed in U.S. Patents Nos. 2,396,680 and 2,396,681 as well as other similar edible antioxidants, can be employed also. Mixtures of such antioxidants can be used, if desired. In fact, a mixture comprising butylated hydroxy anisole, butylated hydroxy toluene and ascorbyl palmitate is used in producing the preferred products of the invention.

The quantities of the various ingredients used in preparing our novel products can be varied within certain limits. Thus, for example, the amount of zein which is used in preparing the dry discrete particles of our invention may be varied. In general, the mixture of the vitamin material, carrier and antioxidant will be added to an organic solvent having dissolved therein a quantity of zein sufficient to provide from about 1.0 part to about 3.0 parts by weight of zein for each part by weight of the fat-soluble, vitamin material. Furthermore, and as indicated heretofore, from about 2 parts to about 6 parts by weight of solvent for each part by weight of zein will be used in carrying out our invention. Moreover, one may use from about 0.5 to about 1.5 parts by weight of carrier for each part by weight of vitamin material employed. Finally, when used, the antioxidant, or the antioxidant mixture, will comprise from about 0.5% to about 12.0% of the total weight of the ingredients in the vitamin, carrier and antioxidant mixture.

As has been indicated heretofore, a mixture of the vitamin material, and the carrier, and, optionally, the antioxidant, is produced in a step preliminary to the actual practice of the invention. The most satisfactory method for accomplishing this, in any given instance, will be determined, for the most part, by the properties of carrier in use. For example, where the surface characteristics of carier used are such that the addition of the vitamin-containing material thereto will result in the adherence of the vitamin material to the surface of the carrier, a suitable mixture will be obtained by completely and thoroughly mixing those ingredients. This mixing operation can be accomplished either at room temperature or at a temperature which is elevated somewhat above room temperature. Ordinarily, when this technique or procedure is utilized, and an antioxidant is to be employed, the antioxidant will be provided in the form of a solvent solution thereof. In the case of butylated hydroxy anisole, butylated hydroxy toluene and ascorbyl palmitate, the antioxidants used in preparing the preferred products of the invention, methyl alcohol is generally used as the solvent therefor. Any other solvent for the antioxidant or antioxidants in use which is compatible with the various zein solvents can be used in place of methyl alcohol, however. Where the carrier is a Polyose product, the foregoing will be found to be an entirely suitable method for preparing the mixture. The mixing of the ingredients is carried out, generally, using some efficient mechanical means. Where, however, a carrier, such as, a Carbowax product, a pectin, palmitic acid, stearic acid, etc. is to be used, somewhat modified methods for producing the desired mixture will be found to be more satisfactory. When, for example, a normally solid polyethylene glycol is used, such as, a Carbowax product, or a solid fatty acid, such as, stearic acid or palmitic acid or where glyceryl monostearate is in use, one can proceed by first heating the carrier to a temperature above its melting point. The vitamin material and, if it is to be used, the antioxidant are subsequently added to the molten mass and mixed therein. On cooling, a completely satisfactory mixture will have been obtained. Where, however, the carrier in use is pectin, starch, starch dextrin, sorbitol powder, nonfat dry milk or a natural gum, such as, guar gum, the carrier can be added to a relatively small quantity of suitable solvent, for example, water or a water-alcohol mixture, and the vitamin material and, optionally, the antioxidant added thereto and intimately admixed therewith. This solvent procedure can, of course, be used also when the carrier employed is a Carbowax product, a normally solid fatty acid, glyceryl monostearate, etc., however, where such a carrier is in use, it is preferred to prepare the desired mixture by the melt method rather than by the solvent method. The mixture, in solvent, is used as such in the practice of the invention. For this reason, the solvent used in preparing the desired mixture should be one which is compatible with zein solvent. The mixture prepared by any one of the foregoing methods or obvious equivalents thereof, is added to, and mixed with, the organic solvent solution of zein to produce the suspension from which our products are prepared.

In general, any one of several procedures or techniques can be utilized to convert the aforementioned suspension into the desired dry, discrete particles. Obviously, the quantity of solvent which is used at the outset in producing the zein solution will be largely determinative of the fluidity of the suspension ultimately obtained. The fluidity of the suspension, in turn, will have considerable bearing on the selection of the procedure which will be most effective in converting the suspension into the discrete vitamin-containing particles of our invention. As indicated heretofore, we prefer to employ a zein solution containing a ratio of from about 2 parts to about 6 parts by weight of solvent for each part by weight of zein. When an organic solvent solution of zein has been used which is relatively dilute insofar as the zein constituent is concerned, as, for example, where the solution comprises from 4 to 6 parts by weight of solvent for each part by weight of zein, a highly satisfactory method for obtaining our products in the form of discrete particles involves the use of a rapidly rotating, perforated, stainless steel vessel, for example, stainless steel cup, which is elevated above floor level. While the height of this vessel above floor level can be varied, we have found that best results are obtained when the vessel is elevated at least about 15 feet above the floor and is centered in a room or chamber at least about six to eight feet from each wall. The suspension is poured into this rotating vessel and our product, in the form of liquid droplets, will be centrifuged out of, and away from, the vessel. To facilitate the removal of the volatile solvent, this operation is preferably carried out in a heated room or chamber, for example, in a room or chamber heated to a temperature of about 100° F. The volatization of the solvent can be expedited also, however, simply by heating the suspension to a temperature of about 100° F. prior to pouring it into the perforated cup and by providing some effective means, for example, a blower, to facilitate the removal of the solvent vapor from the chamber. However, by increasing the height of the fall of the particles and by maintaining the room or chamber below the saturation point of the solvent, the production of the solid particles can be accomplished at ordinary room temperatures. Under the described conditions, by the time that the droplets have completed their free flight through the air and have come to rest on the floor, they will have become substantially solidified. Using this centrifuging method, the size of the particles of the product can be regulated by changing the speed at which the perforated vessel is rotated. By increasing or decreasing the speed at which the vessel is rotated, one can decrease or increase, respectively, the size of the particles obtained. Moreover, adjustment in the size of the particles can be accomplished by increasing or decreasing the amount of organic solvent which is used. As a general rule, particles of larger size will be obtained from a more highly concentrated suspension.

An alternative method for obtaining our product in the form of discrete particles has been found to be satisfactory where a lesser quantity of solvent is used initially in preparing the zein solution. Such would be the case where the zein solution which was employed originally in producing the suspension contained about 3 parts by weight of solvent for each part by weight of zein. This procedure involves pouring the suspension onto a suitable surface, as, for example, a stainless steel plate or conveyor, spreading it thinly over the plate or conveyor and permitting the solvent to evaporate under normal atmospheric conditions. Removal of the solvent can be facilitated by blowing air or nitrogen gas over the surface of the film. Carrying out the procedure in a heated room, for example, in a room heated to about 100° F. obviously, will, increase the rate at which the solvent is volatilized. When all of the solvent has been volatilized, the dry film is removed from the plate or conveyor by any convenient or appropriate means, for example, a doctor blade, and subsequently reduced to particles of desired size by means of the use of some suitable grinding or pulverizing apparatus.

Another method for preparing our product in the form of dry discrete particles will be found to be particularly effective where an even more concentrated solution of zein, for example, a solution containing 2 parts by weight of solvent for each part of zein, is used at the outset. This procedure involves pouring the suspension into a suitable vessel containing a relatively large amount of crushed ice. The suspension is mixed vigorously therein while the temperature is maintained at about 15° C., or lower, and, preferably at about 5° C. A fine powdery product, which settles out to the bottom of the container, is formed by this procedure. When the ice has melted and the powder has completely settled, the water may be either siphoned off by suitable means or the powdery product may be separated therefrom by filtration. The powdery product thus obtained is subsequently dried under vacuum. Other methods for obtaining our products in the form of discrete particles will be immediately apparent to those skilled in the art. One other such process is a spraying procedure such as is disclosed in U.S. Patents 2,777,797 and 2,777,798.

Many advantages flow from the practice of our invention. By it, one can obtain vitamin compositions in the form of dry free-flowing particles. These products will be found to possess a very high degree of stability. Under conditions of high humidity, a situation often encountered either in the storage of the products themselves or in the storage of feed supplemented therewith, these products are superior in stability to the conventional gelatin-type products. Moreover, our products will be found to be readily available and/or effective biologically. The high stability and biological availability and/or effectiveness of the products of this invention will render them well suited for use in the formulation of animal and poultry feeds, in the preparation of pharmaceutical tablets and powders and in the production of food for human consumption. A particularly outstanding feature of the invention resides in the fact that certain properties thereof render our products highly satisfactory for use in particular commercial applications. For example, our products have great utility in the pelleting of stock and poultry feed and in the production of vitamin fortified animal foods, such as, cooked dog foods. In pelleting, ideal steam application will raise the meal temperature to from 180° F. to 190° F. and the feed will be raised to a high moisture content. In the production of cooked dog foods, the temperature of the mass will reach 212° F. or slightly higher. When our products are used in those, and other comparable, procedures, under such extreme conditions, the vitamin ingredients therein are not destroyed and the biological availability and/or effectiveness thereof is not impaired. In addition, our products are extremely well suited for use in the production of pharmaceutical tablets. No deterioration or destruction of vitamins in our products occurs during the conventional tablet compression procedures. Moreover, the vitamins in our products are stable even in the presence of compounds in the tablets, for example, minerals, which, under ordinary circumstances, exert an adverse or deleterious effect on vitamins. Our invention is noteworthy also in that, while it provides easily handled products having outstanding stability properties and enhanced biological availability and/or effectiveness characteristics, the procedure by which these products are obtained is quite economical in its operation and readily adaptable for use in the production of the products in commercial quantities. For example, the utilization of rigid humidity controls such as characterize the production of gelatin-type products is obviated by our invention. Moreover, although mild external heating can be utilized in certain stages of the procedure to facilitate the preparation of our products, the fact that our products can be produced at relatively low temperatures, for example, at temperatures at or near room temperature, is a further feature of the invention.

For a fuller understanding of the nature and objects of this invention, reference may be had to the following examples which are given merely as further illustrations of the invention and are not to be construed in a limiting sense. All parts given in the examples are parts by weight, unless otherwise indicated.

*Example I*

To exemplify one of the several methods by which the products of this invention are prepared, the following procedure was carried out: Fifty parts of zein were first added to, and dissolved, in 300 ml. of anhydrous methyl alcohol. The dissolution of the zein in the methyl alcohol was accomplished while the alcohol was at a temperature of 60° C.

In a separate vessel 3.0 parts of butylated hydroxy anisole, 1.5 parts of butylated hydroxy toluene and 1.5 parts of ascorbyl palmitate were dissolved in 10 ml. of methyl alcohol. To this solution, 25.0 parts of vitamin A palmitate having a potency of 1,000,000 U.S.P. units of vitamin A per gram were added. This mixture was agitated, at high speed, using a mechanical stirrer. A current of nitrogen gas was passed, continuously during the stirring, over the opening of the vessel in which the mixing was taking place. Thereafter, 19.0 parts of Polyose D, a synthetic polysaccharide sold by Corn Products Sales Company, New York, New York, was added to the mixture with stirring. Vigorous agitation was continued until the mixture was uniform. The solvent solution of zein was thereafter added to the mixture while the mixture was being stirred by mechanical means at 3000 r.p.m. Stirring was continued while the zein solution was being added to the mixture and thereafter until a uniform suspension was obtained.

Discrete particles were obtained from the suspension in the following manner: In a room or chamber, the floor of which was heated to a temperature of about 100° F., a perforated stainless steel cup was suspended about 15 feet above floor level. The metal cup was approximately 4 inches in diameter and it was attached to a high speed motor shaft. With the cup spinning at a speed of about 5000 r.p.m., the suspension was slowly poured therein. Discrete liquid droplets were centrifuged out of, and away from, the spinning cup. By the time that they had completed their free flight through the air, these liquid droplets had substantially solidified to form small sized, discrete particles, each of which were stable and readily available and/or effective biologically.

The Polyose D used in the above example is a white to light tan colored powdery product produced by the controlled and catalyzed polymerization of special corn sugars. It is soluble in water and insoluble in organic solvents. In the form of a 10% aqueous solution it has a pH of not less than 3.5 and in the form of a 40% solids solution in water it has a viscosity of 20 to 100 poises at 70° F.

*Example II*

In this example, an alternate method for producing our products in the form of dry, solid particles was employed. The ingredients, and the quantities thereof, which were used in Example I were used herein except that, in this example, 150 ml. of anhydrous methyl alcohol was employed in producing the zein solution instead of the 300 ml. used in the previous example. The procedures used in this example in preparing the zein solution and mixture of vitamin material, carrier and antioxidant were the same as those employed in Example I.

The product in the form of discrete particles was obtained as follows: A suspension of the mixture of the vitamin material, carrier and antioxidant in the zein solution was first prepared by the procedure described in Example I. The suspension thus obtained was poured onto a stainless steel plate and, with the aid of a doctor blade, it was spread to form a thin layer, that is, a layer of about 0.007 inch, over the surface of the plate. It was allowed to dry at ordinary room temperature. When the solvent had completely evaporated, the thin, brittle film, thus formed, was removed from the plate and reduced to discrete particles by means of the use of a grinding apparatus.

The product, thus produced, was stable and biologically available and/or effective.

*Example III*

This example is directed to a third method for producing our novel products. The ingredients employed herein, and the quantities thereof used, were the same as those used in Example I, except that, in this example, 100 ml. of anhydrous methyl alcohol were used in place of the 300 ml. thereof employed in Example I. The procedures used in this example both in the preparation of the zein solution and in the preparation of the mixture of the vitamin material, carrier and antioxidant were the same as those employed in Example I.

The product, in the form of discrete particles, was obtained as follows: The mixture of the vitamin material, carrier and antioxidant was suspended in the zein solution by the method described in Example I. Thereafter, this suspension was poured slowly into a vessel containing 500 grams of crushed ice. This mixture was then stirred at about 3000 r.p.m. using a mechanical stirrer, the temperature during the initial stirring being maintained at about 5° C. A fine powdery product was formed which tended to settle to the bottom of the vessel. The ice was allowed to melt and, when it had melted, stirring was discontinued and the powdery product was allowed to settle out. The product was separated from the water by filtration and the residual powdery product was thereafter dried under vacuum.

The product, thus obtained, was stable and readily available and/or effective biologically.

*Example IV*

In this example, 37.6 parts of zein were first added to, and dissolved, in 150 ml. of anhydrous methyl alcohol which had been heated previously on a steam bath to a temperature of about 60° C. Concurrently therewith, 1.6 parts of butylated hydroxy toluene, 2.8 parts of butylated hydroxy anisole and 1.6 parts of ascorbyl palmitate were dissolved, at a temperature of about 50° C., in 20.0 parts of vitamin A palmitate having a potency of 1,000,000 U.S.P. units of vitamin A per gram. To this mixture, 12.0 parts of melted Carbowax 6000 were added. To this, 24.0 parts of Polyose D were added with agitation. Thereafter, the solution of zein, which was prepared in the manner described heretofore, was added to the mixture. During this step the mixture was stirred at about 3000 r.p.m. Vigorous agitation was continued until a uniform suspension was obtained.

Discrete particles were obtained from the suspension by the centrifuging method described in Example I.

The stability of the product obtained in this example was evaluated by accelerated storage tests. These tests involved the storage of samples of the product in an incubator for a period of three months at a constant temperature of 37° C. and the storage of other samples in an incubator for a period of two months at a constant temperature of 45° C. Before storing same, however, the particles were assayed for their vitamin A content and were found to contain an average of 200,000 U.S.P. units of vitamin A per gram. In the case of the samples stored at a temperature of 37° C., the product was assayed once again after one month of storage and again after three months storage. At the end of one month storage at 37° C., no destruction of vitamin A had occurred. At the end of three months storage at 37° C., the assay revealed that the product had retained about 80% of its original vitamin A potency. In the case of the product stored at 45° C., an assay was carried out at the end of two months. Storage at that temperature and for that period of time is generally considered to be equivalent to storage for a period of one year at normal temperatures. Assay of the samples stored for 2 months at 45° C. revealed that the product had retained 64% of its original vitamin potency.

The product of this example was tested for its biological effectiveness and availability as follows: two separate lots of one day old New Hampshire Cockerel chicks, the lots comprising 10 chicks each, were fed a basal diet to which had been added the product of this example. A sampling of birds in the same lot from which these were taken revealed that, on the average, these chicks contained an average of about 65 units of vitamin A per total weight of liver before being placed on the test diet. The product of the example, on the basis of its assayed vitamin A potency, was added to the feed in such quantities as to provide a level of 4800 International Units of vitamin A per pound of feed. The chicks were provided with this vitamin supplemented feed and with water, ad libitum, for a period of 28 days. At the end of that time, the livers were removed from four representative birds in each of the two lots. The freshly removed livers were analyzed for vitamin A content by the method of Galleys and Hoefer described in Ind. Eng. Chem. (Anal. Edition), 18, 288 (1946). The assay revealed the storage of an average of 1000 International Units of vitamin A in the total liver.

The foregoing result demonstrated that the product of this example possessed excellent biological availability and/or effectiveness characteristics.

*Example V*

In this example, 54.0 parts of zein were first dissolved in 280 ml. of anhydrous methyl alcohol which had been previously heated to a temperature of 60° C.

In a separate vessel, 2.7 parts of butylated hydroxy anisole, 1.35 parts of butylated hydroxy toluene and 1.35 parts of ascorbyl palmitate were mixed. This mixture was then dissolved in 10 ml. of heated methanol. Thereafter, 27.0 parts of vitamin A palmitate having a potency of 1,750,000 U.S.P. units of vitamin A were added to the antioxidant solution and mixed vigorously therewith. While agitation was continued, 13.5 parts of Carbowax 4000, which had been previously dissolved in 10 ml. of anhydrous methyl alcohol, were added to the mixture.

The solvent-containing mixture of vitamin material, carrier and antioxidant was subsequently mixed vigorously with the solvent solution of zein. The product, in the form of the desired discrete particles, was obtained by the centrifuging method described in Example I.

This product was evaluated for its stability by the method described in Example IV. It was found that this product, after storage in an incubator at a temperature of about 37° C. for a period of one month, had retained 93% of its original vitamin A potency. Moreover, it was found that the product had retained about 80% of its original vitamin A potency at the end of three months exposure to the atmosphere at 37° C. In the case of the samples of this product which were stored in an incubator at a constant temperature of about 45° C., assay revealed that the product retained about 74% of its original vitamin A potency at the end of two months.

This product was evaluated for its biological availability and/or effectiveness by the test method described in Example IV. In this instance, however, the chicks were maintained on the test diet for a period of 27 days rather than 28 days. A sampling of birds in the same lot from which those used in this test were taken revealed that these chicks contained an average of about 65 units of vitamin A per total weight of liver before being placed on the test diet.

At the end of the test period, the weight of the birds which were fed a feed containing the product of this example was found to have increased on the average of 238.4 grams. Each bird consumed an average of 555.95 grams, or 1.225 pounds, of feed during the test period. Since the feed contained 4800 International Units of vitamin A per pound, the total average vitamin A intake, per bird, was about 5800 International Units.

The livers of a representative number of those birds were, thereafter, assayed for stored vitamin A by the method described in Example IV. Analysis revealed the storage of an average of 1898 International Units of vitamin A in the total liver. This represented the storage of about 32.2% of the total vitamin A intake. In general, the storage of any quantity of vitamin A above 20% of the total vitamin A intake indicates exceptional availability of the vitamin source. The storage of 32.2% of the total vitamin A intake in the present instance demonstrates the outstanding biological availability of the product of this example.

*Example VI*

In this example 52.0 parts of zein were first added to, and dissolved in, 200 ml. of solution comprising 80% by weight of methyl alcohol and 20% by weight of water. Prior to adding the zein thereto, the aqueous alcohol had been heated to a temperature of 60° C.

In a separate mixing vessel, 50 ml. of a 40% methyl alcohol in water was added to 10.0 parts of Pectin N.F. The latter product is pectin produced by Colyer Pectin Company, New York, New York. These ingredients were mixed until the solvent was taken up by the pectin and swelling of the pectin resulted. Mixing was continued until a smooth preparation was obtained.

In another separate container, 3.0 parts of butylated hydroxy anisole, 1.5 parts of butylated hydroxy toluene and 1.5 parts of ascorbyl palmitate were dissolved in 5 ml. of methyl alcohol. Thereafter, 32.0 parts of vitamin A palmitate having a potency of 1,750,000 U.S.P. unit of vitamin A per gram were added to, and mixed with, the antioxidant solution.

Subsequently, the vitamin A-antioxidant mixture was mixed with the pectin preparation heretofore described. The mixture was stirred and heated on a steam bath at a temperature of about 60° C. A mechanical means of agitation was employed. Thereafter, the solution of zein in aqueous methyl alcohol, prepared as described heretofore, was then added to that mixture. The ingredients were stirred vigorously until a uniform suspension was obtained.

The desired product, in the form of small, solid particles was obtained from this suspension by the method described in Example IV. The vitamins in this product were found to be highly stable. Assay of samples of the product, after storage at 37° C. for one month and three month periods, revealed that the product had retained 89% and 75%, respectively, of its original vitamin A potency. Assay of samples stored at 45° C. revealed that the product had retained 60% of its original vitamin A potency at the end of two months.

Moreover, the product was found to possess excellent biological availability and/or effectiveness characteristics when evaluated by the method described in Example IV. In this case, however, the study was conducted using White Ventress chicks rather than New Hampshire Cockerel chicks. A sampling of birds from the same lot from which the chicks used in the present tests were taken revealed that, before being placed on the test diet, these contained, an average of about 65 units of vitamin A per total weight of liver.

At the end of the 28 day test period, the weight of the birds which were fed a feed containing the product of this example was found to have increased an average of about 415.6 grams. Each bird consumed an average of 839.1 grams, or 1.848 pounds, of feed during that period. Since the feed contained 4800 International Units of vitamin A per pound, the average total vitamin A intake, per bird, was about 8870 International Units.

The livers of a representative number of these birds were, thereafter, assayed for stored vitamin A by the method described in Example IV. Analysis revealed the storage of an average of 2559 International Units of vitamin A in the total liver. This represented the storage of about 28.8% of the total vitamin intake. Since, as indicated heretofore, the storage of any quantity of vitamin A above about 20% of the total vitamin A intake indicates exceptional availability of the vitamin source, the storage of 28.8% of the total vitamin A intake in the present instance was considered to be demonstrative of the outstanding biological availability of the product of this example.

*Example VII*

In this example, 56.3 parts of zein were first added to and dissolved in 260 ml. of anhydrous methyl alcohol. The alcohol was previously heated to a temperature of about 60° C.

In a separate vessel, 3.0 parts of butylated hydroxy toluene, 1.5 parts of butylated hydroxy anisole, 1.5 parts of ascorbyl palmitate were dissolved in 10 ml. of methyl alcohol. To the antioxidant solution, 25.2 parts of vitamin A palmitate having a potency of 1,095,000 U.S.P. units of vitamin A per gram were added. This mixture was agitated vigorously and, concurrently therewith, a current of nitrogen gas was passed over the opening at the top of the vessel. While the mixture was being stirred, a solution comprising 12.5 parts of Carbowax 4000 dissolved in 10 ml. of methanol was introduced therein. Thereafter, the zein solution was added to, and mixed with, that mixture. The product, in the form of discrete particles was obtained by the method described in Example I.

The product, thus produced, was evaluated for its stability by the accelerated storage method described in Example IV. The product was found to have retained 100% of its original vitamin A potency at the end of one month, and 80% of the original vitamin A potency at the end of three months, at 37° C. Assay of samples of the product stored at 45° C. revealed that the product had retained 71% of its original vitamin A potency at the end of two months. Moreover, the product was evaluated for its biological availability and/or effectiveness by the liver storage method set out in Example IV and the product was found to possess a very high degree of biological availability and/or effectiveness. While the test method was the same as that described in Example IV, the present products were evaluated using one day old White Ventress chicks which contained an average of 65 units of vitamin A per total weight of liver before being placed on the test diet.

At the end of this test period, the weight of the birds which were fed a feed supplemented with the product of this example was found to have increased an average of 352.1 grams. Each bird consumed an average of 745.75 grams, or 1.6426 pounds, of feed during the period. Since the feed contained 4800 International Units of vitamin A per pound, the average total vitamin A intake, per bird, was about 7886 International Units.

The livers of a representative number of these birds were, thereafter, assayed for stored vitamin A by the method described in Example IV. Assay revealed the storage of an average 2285 International Units of vitamin A in the total liver. This represented the storage of about 29.0% of the total vitamin A intake. Since, as indicated heretofore, the storage of any quantity of vitamin A above 20% of the total vitamin A intake indicates exceptional availability of the vitamin source, the storage of 29% of the total vitamin A intake in the present instance demonstrated the outstanding biological availability of the product of this example.

To demonstrate that the stability of the product of this invention is attributable to the combination of the ingredients comprising the products, the product of this example was compared with a product identical thereto in all respects, except one. The product employed for comparative purposes differed from the product of the example only in that it contained no Polyose D.

Sufficient quantities of the product of this example were then added to a commercial mineral mixture in such quantities as to provide therein a level of 1000 U.S.P. units of vitamin A per gram of mixture. The same type of mixture was prepared using the comparative product. Each mixture was assayed initially for vitamin A and then stored at a constant temperature of 37° C. Samples of each mixture were thereafter assayed for vitamin A at the end of one month, two months and three months storage. The results of this test are set forth in the table which follows:

|  | Percent of Vitamin A Potency Retained | | |
| --- | --- | --- | --- |
|  | One Month | Two Months | Three Months |
| Product of Example VII | 90 | 67 | 64.5 |
| Comparative (No Polyose D) Product | 57 | 34 | 26.2 |

The foregoing clearly demonstrates that the superior stability of the products of this invention is attributable to the use of a combination of zein, the carrier and the antioxidant in a vitamin A product.

*Example VIII*

In this example, 47.5 parts of zein were first added to, and dissolved in, 100 ml. of 80% methyl alcohol which had been heated previously on a steam bath to a temperature of about 60° C. Concurrently therewith, 2.9 parts of butylated hydroxy anisole, 1.6 parts of butylated hydroxy toluene and 1.2 parts of ascorbyl palmitate, were dissolved, using mild heat, in 20.0 parts of vitamin A palmitate which assayed at 1,000,000 U.S.P. units of vitamin A per gram. To this mixture, 11.7 parts of guar gum was added. The mixture, thus obtained, was agitated using a high speed stirrer for a period of about 3 minutes. Thereafter, 10.0 parts of Carbowax 6000 were melted on a steam bath and added to, and mixed with, the mixture using a high speed stirrer. When the mixture was homogeneous, the zein solution, prepared as described above, was added thereto and high speed agitation was continued for 5 minutes.

The smooth flowing preparation which was obtained was poured onto a stainless steel plate and, with the aid of a doctor blade, it was spread to a film of approximately 1/60 of an inch thickness. It was allowed to dry, at room temperature, to a brittle film. The brittle film was removed from the plate and it was converted to solid particles by grinding.

The product, thus obtained, was evaluated for its stability by the accelerated storage method described in Example IV. The product was found to have retained 90% of its original vitamin A potency at the end of one month, and 78% of its original vitamin A potency at the end of three months, at 37°C. Assay of samples of the product stored at 45° C. revealed that the product retained 73% of its original vitamin A potency at the end of two months.

In its biological availability and/or effectiveness, this product proved to be satisfactory.

*Example IX*

In this example, 47.5 parts of zein were first dissolved in 100 ml. of 80% methyl alcohol which had been heated previously on a steam bath to a temperature of about 60° C. Concurrently therewith, 2.8 parts of butylated hydroxy anisole, 1.4 parts of butylated hydroxy toluene and 1.1 part of ascorbyl palmitate were dissolved, using mild heat, in 23.75 parts of vitamin A palmitate which assayed at 1,750,000 U.S.P. units of vitamin A per gram. Thereafter, this vitamin-antioxidant mixture was added to 23.5 parts of guar gum and mixed well therewith. Subsequently, the solution of zein, prepared as described heretofore, was added to and mixed with, the vitamin-antioxidant guar gum mixture using high speed agitation. The product, thus obtained, was reduced to small size particles by the method described in Example I.

A test was conducted to evaluate the products of this invention for use under conditions of high humidity. In conducting this test, a sufficient quantity of the product was added to a commercial trace mineral mixture to provide a product containing a level of 1000 U.S.P. units of vitamin A per gram. The product was initially assayed for its vitamin A potency. This product was maintained at a constant temperature of 37° C. and a constant relative humidity of 80% for a period of one month. Samples of the product were assayed for vitamin A at the end of 14 days and one month storage. For comparative purposes, a commercially available vitamin A in gelatin product was subject to the same test. The results of these tests were as follows:

|  | Percent Vitamin A Retained | |
| --- | --- | --- |
|  | 14 days | One month |
| Product of Example IX | 73 | 61 |
| Gelatin-Type Product | 64 | 44 |

These results clearly demonstrate that, under conditions of high humidity, the products of this invention are superior in stability as compared to the ordinary gelatin type product.

*Example X*

For compartive purposes, and to more dramatically demonstrate the greatly enhanced biological availability and/or effectiveness of the products of this invention, a liver storage study was conducted on chicks which were fed a feed supplemented with conventional sources of vitamin A, namely, fish liver oil and synthetic vitamin A palmitate in an oil carrier. In this study, a total 36 one day old White Ventress chicks were divided into two lots of 18 chicks each. Each lot was subjected to a liver storage study substantially identical to that described in the preceding examples. One lot of chicks was fed a basal diet which contained sufficient quantities of fish liver oil to provide a level of 4800 International Units of vitamin A per pound of feed. The chicks were provided with this supplemented feed, and with water, ad libitum, for a period of 24 days. The second lot of chicks were fed a basal diet which contained sufficient quantities of synthetic vitamin A palmitate in a corn oil carrier to provide a level of 4800 International Units of vitamin A per pound of feed. This lot of chicks was provided with this supplemented feed, and with water, ad libitum, for a period of 24 days.

After 24 days on these regimens, the lot of chicks which had received the feed supplemented with fish liver oil had gained an average of 261.5 grams. The chicks in this test lot had consumed an average of 1.112 pounds of feed during the test period. Since the feed contained 4800 International Units of vitamin A per pound of feed, this represents an average total vitamin A intake, per bird, of about 5338 International Units of vitamin A. The livers of a representative number of the birds in this lot were thereafter assayed for stored vitamin A by the method described in the Example IV. Assay revealed the storage of 462 International Units of vitamin A in the total liver. This represented the storage of about 8.6% of the total vitamin A intake.

The chicks in the second lot, that is, the chicks receiving the feed supplemented by vitamin A palmitate in a corn oil carrier, had gained an average of 265.9 grams at the end of the 24 day test period. Each chick in the lot had consumed an average of 1.165 pounds of feed during that period. This represented an average total vitamin A intake, per bird, of about 5592 International Units of vitamin A. The livers of a representative number of birds in this lot were thereafter assayed for stored vitamin A by the method described in Example IV. Assay revealed the storage of an average of 475 International Units of vitamin A in the total liver. This represented the storage of about 8.5% of the total vitamin A intake.

The foregoing results, when compared with the results reported in the previous Examples V, VI and VII, dramatically depict the value of the present products as means for fortifying feeds with vitamins. The storage of 8.6% and 8.5% of the total vitamin A intake in the case of chicks fed feeds supplemented with fish liver oil and synthetic vitamin A in a corn oil carrier, respectively, is to be contrasted with the storage in the liver of over 28% of the total vitamin A intake in the case of chicks fed a diet supplemented by the vitamin-containing products of this invention. In the preceding Example V, the vitamin A storage in the livers of the chicks where were fed a feed containing the product of that example amounted to 32.2% of the total vitamin A intake. In Example VI hereof, vitamin A storage in the livers of the chicks which were fed a feed containing the product of that example amounted to 28.8% of the total vitamin intake. In Example VII, vitamin A storage in the livers of chicks fed a feed containing the product of that example amounted to 29% of the total vitamin A intake. These results, when contrasted with those obtained when fish oil and vitamin A palmitate in an oil carrier were used, clearly indicate the greatly enhanced biological availability and/or effectiveness of the products of the invention.

Having described our invention, what we claim as new and desire to secure by Letters Patent is:

1. Stable and biologically available and effective vitamin-containing compositions in discrete, particulate form consisting essentially of, in intimate admixture
   (a) a fat-soluble vitamin material selected from the group consisting of vitamins A, D, E and K, (b) a hydrophilic carrier for said vitamin material which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution, and (c) zein, said (b) being present in said vitamin-containing composition in a ratio of from about 0.5 part to about 1.5 parts by weight for each part by weight of said (a) and said (c) being present in said vitamin-containing composition in a ratio of from about 1.0 part to about 3.0 parts by weight for each part by weight of said (a).

2. Stable and biologically available and effective vitamin-containing compositions in discrete, particulate form consisting essentially of, in intimate admixture (a) a fat-soluble vitamin material selected from the group consisting of vitamins A, D, E and K, (b) a hydrophilic carrier for said vitamin material which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution (c) zein, and (d) an effective edible antioxidant, said (b) being present in said vitamin-containing composition in a ratio of from about 0.5 part to about 1.5 parts by weight for each part by weight of said (a), said (c) being present in said vitamin-containing composition in a ratio of from about 1.0 part to about 3.0 parts by weight for each part by weight of said (a), and said (d) comprising from about 0.5% to about 12.0% of the total weight of said composition.

3. Stable and biologically available and effective vitamin-containing compositions in discrete, particulate form consisting essentially of, in intimate admixture (a) a fat-soluble vitamin material selected from the group consisting of vitamins A, D, E and K, (b) a hydrophilic carrier for said vitamin material which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution, (c) zein, and (d) an effective edible antioxidant selected from the group consisting of butylated hydroxy toluene, butylated hydroxy anisole, ascorbyl palmitate and mixtures thereof, said (b) being present in said vitamin-containing composition in a ratio of from about 0.5 part to about 1.5 parts by weight for each part by weight of said (a), said (c) being present in said vitamin-containing composition in a ratio of from about 1.0 part to about 3.0 parts by weight for each part by weight of said (a), and said (d) comprising from about 0.5% to about 12.0% of the total weight of said vitamin-containing composition.

4. Process for producing stable and biologically available and effective vitamin-containing compositions in discrete particulate form consisting essentially of mixing a solvent solution consisting essentially of zein and from about 2 to about 6 parts by weight, for each part by weight of said zein, of an organic solvent with a mixture consisting essentially of a fat-soluble vitamin material selected from the group consisting of vitamins A, D, E and K and, for each part by weight of said vitamin material, a ratio of from about 0.5 to about 1.5 parts by weight of a hydrophilic carrier for said vitamin material which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution, and subsequently removing the solvent therefrom, said zein being present in the system in a ratio of from about 1.0 to about 3.0 parts by weight for each part by weight of the vitamin material present.

5. The process of claim 4 wherein methanol is used as the solvent.

6. Process for producing stable and biologically available and effective vitamin-containing compositions in discrete particulate form consisting essentially of mixing a solvent solution consisting essentially of zein and from about 2 to about 6 parts by weight, for each part by weight of said zein, of an organic solvent with a mixture consisting essentially of a fat-soluble vitamin material selected from the group consisting of vitamins A, D, E and K and, for each part by weight of said vitamin material, a ratio of from about 0.5 to about 1.5 parts by weight of a hydrophilic carrier for said vitamin material which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution, and an effective edible antioxidant, said antioxidant comprising from about 0.5% to about 12.0% of the total weight of the composition, and subsequently removing the solvent therefrom, said zein being present in the system in a ratio of from about 1.0 to about 3.0 parts by weight for each part by weight of the vitamin material present.

References Cited in the file of this patent

UNITED STATES PATENTS

| | | |
|---|---|---|
| 2,540,253 | Gakenheimer | Feb. 6, 1951 |
| 2,777,797 | Hochberg | Jan. 15, 1957 |
| 2,798,838 | Robinson | July 9, 1957 |

OTHER REFERENCES

Winters: J. of Am. Pharm. Ass'n. (Sci. Ed.), vol. 47, No. 8, August 1958, pages 608 and 609.

Cosler: Chem. Abst., vol. 52, 1958, page 17559g.

UNITED STATES PATENT OFFICE

CERTIFICATE OF CORRECTION

Patent No. 3,067,105                     December 4, 1962

Herman D. Ratish et al.

It is hereby certified that error appears in the above numbered patent requiring correction and that the said Letters Patent should read as corrected below.

Column 1, line 29, for "ecective" read -- effective --; column 2, line 44, for "obtatined" read -- obtained --; line 67, for "at" read -- as --; column 3, line 50, for "Corn Products Co." read -- Corn Products Sales Co. --; column 4, line 55, for "carier" read -- carrier --; column 10, line 37, for "5800" read -- 5880 --; column 14, line 65, after "fish" insert -- liver --.

Signed and sealed this 17th day of December 1963.

(SEAL)
Attest:

ERNEST W. SWIDER
Attesting Officer

EDWIN L. REYNOLDS

Acting Commissioner of Patents